Nov. 1, 1966 L. H. FOSTER ET AL 3,282,331
APPARATUS FOR RECONSTITUTING FROZEN FOODS
Filed April 16, 1964 3 Sheets-Sheet 1

INVENTORS
LAWRENCE H. FOSTER
HAROLD BUSH
BY
ATTORNEYS

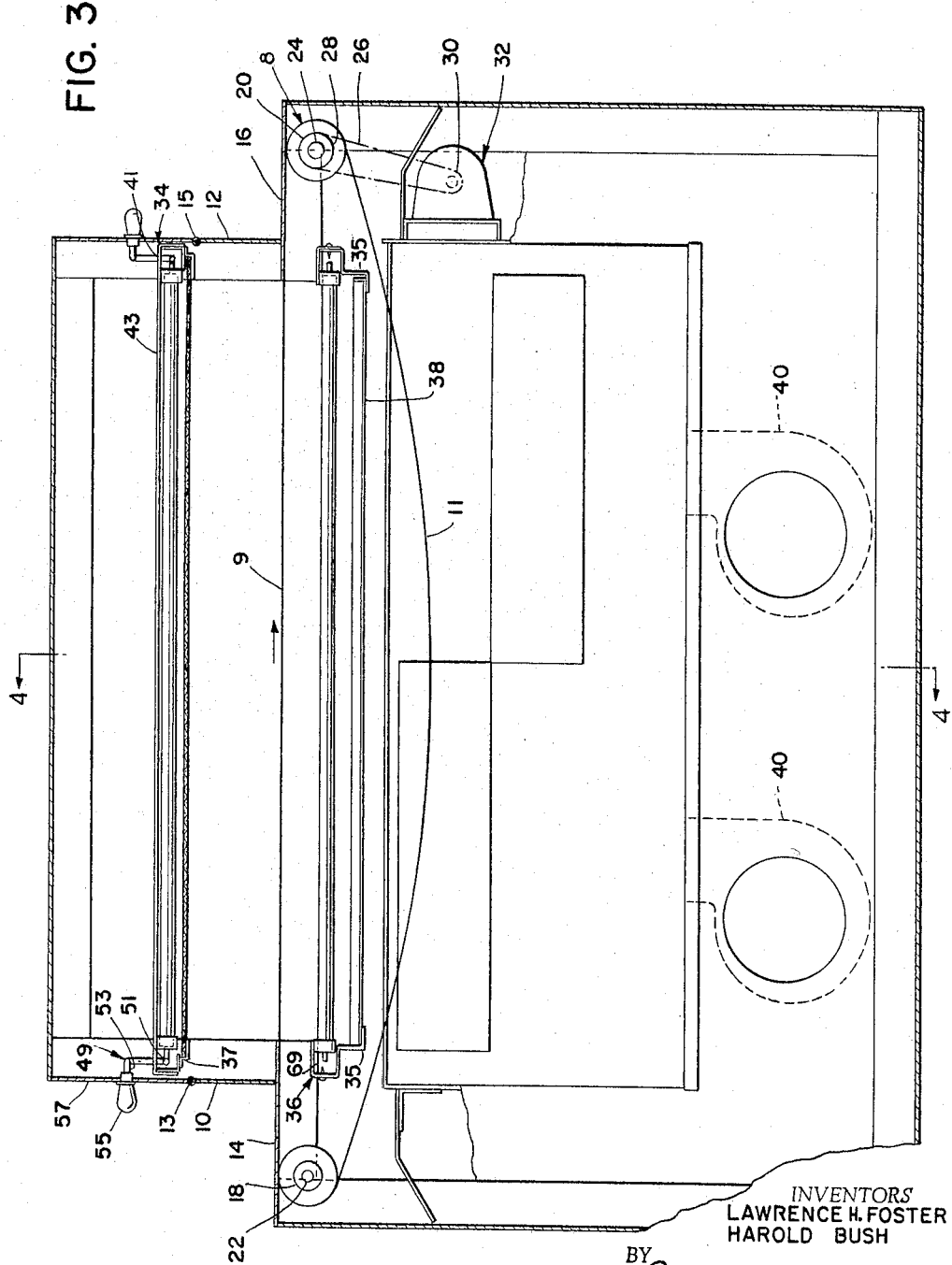

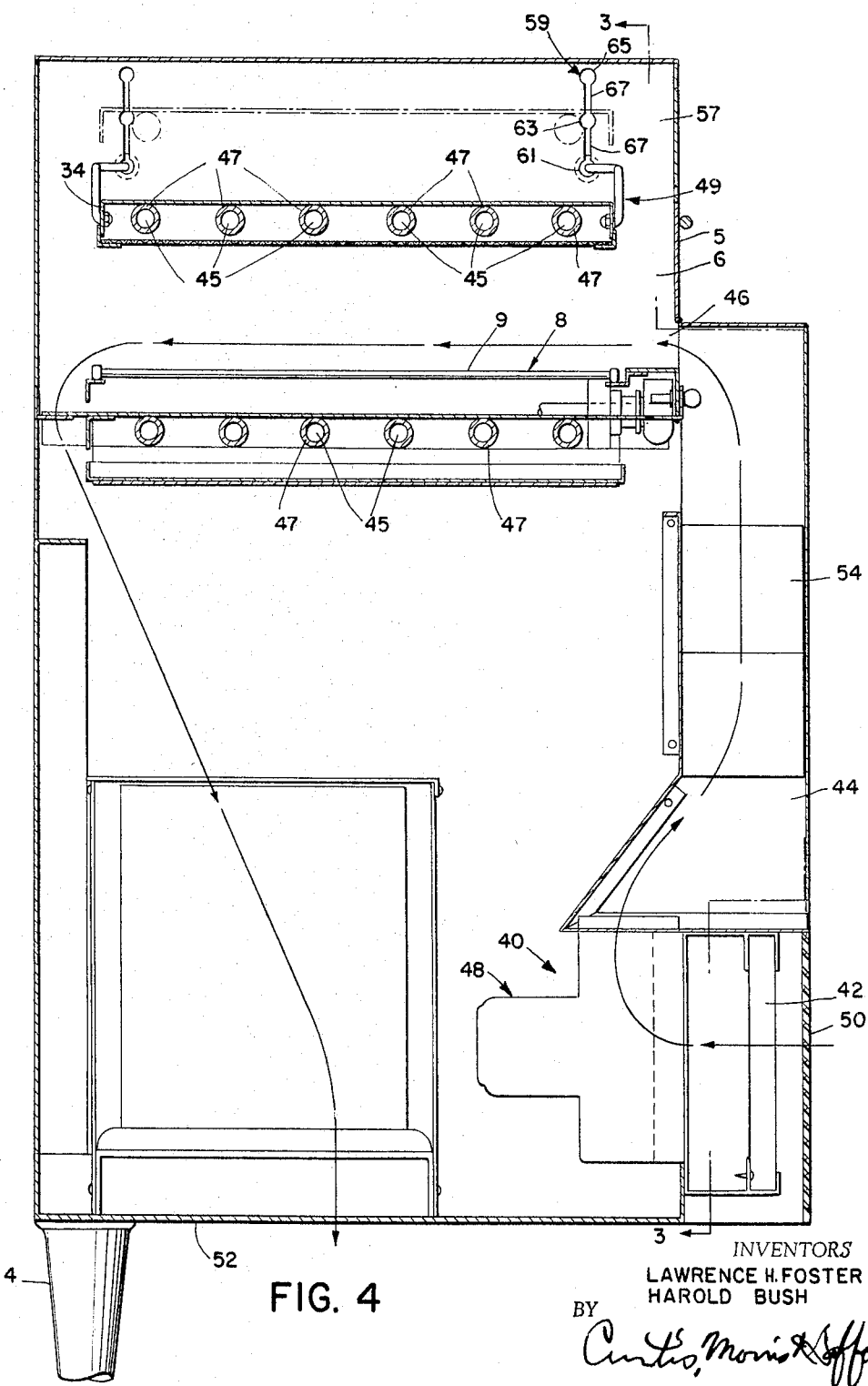

United States Patent Office 3,282,331
Patented Nov. 1, 1966

3,282,331
APPARATUS FOR RECONSTITUTING
FROZEN FOODS
Lawrence H. Foster, 11 Ogden St., Scarsdale, N.Y., and
Harold C. Bush, Hudson, N.Y.
Filed Apr. 16, 1964, Ser. No. 360,254
13 Claims. (Cl. 165—12)

This invention relates to refrigeration and to food preservation; and, to the processing of frozen food to reconstitute it for consumption. The invention relates particularly to processing frozen foods to preserve the desired qualities of taste, texture and nutritive values during and after the reconstituting of the foods for consumption. This invention is related to those disclosed in our co-pending applications, Serial No. 272,202, filed April 11, 1963, now abandoned, and Serial No. 273,452, filed April 16, 1963.

Great strides have been made in the freezing, storing and handling of frozen foods so as to maintain the various desirable characteristics. However, difficulties are still encountered in the proper handling of the food shortly prior to consumption. This is a very serious problem in establishments where large numbers of people are fed.

Many foods are now packaged and frozen after having been fully prepared for consumption so that the food is merely reconstituted (i.e. thawed and heated to the desired temperature for immediate use). Such foods are generally enclosed in a sealed package, for example, in a disposable tray or dish and covered or enclosed in transparent plastic film. In such condition the packages are stored at a sub-zero temperature, and they may be inspected at any time or placed on display to the potential customer or consumer. It has been found that a number of different foods in the desired quantities for an entire meal can be packaged in such a way as to be extremely attractive, with each of the various foods having an attractive appearance similar to that which it had prior to freezing.

However, even though the frozen food in storage is in excellent condition in all respects, great difficulty has been encountered in "reconstituting" the food for consumption. In many cases the food is seriously damaged during thawing or during heating. In other cases, the damage may not appear to be serious, even though there has been objectionable impairment of the desirable quality characteristics such as taste, appearance, and vitamin content. Hence, frozen foods which reach the kitchen with all their original desirable qualities are often served in quite inferior condition.

Foods have been placed in a hot oven while still in the fully frozen condition, with the result that the outside has become overheated and somewhat damaged prior to the time when the foods were fully thawed. With such a procedure it is difficult to be certain when the foods are completely thawed, so that some foods have been served while still partly cold or even frozen. This is especially true when a single package contains foods of different types, shapes, sizes, or heat-absorbing and thawing characteristics. For example, a package meal may contain meat and vegetables which may vary from each other in many ways.

Another serious difficulty which has been encountered, has been the "time element" involved in reconstituting frozen foods. Illustratively, the foods may be in "permanent" storage at a temperature of the order of minus 10° F., and they may be removed and stored at a temperature somewhat above freezing for a period of time sufficient to permit complete thawing before being heated for consumption. However, that procedure makes it necessary to anticipate the consumption needs and to remove the desired quantity of foods from the "permanent" storage twelve to twenty-four hours ahead of time. Even this time-consuming method, however, does not always prevent certain foods from deteriorating during the long period of thawing or later.

Another serious problem has been that there has been no equipment available by which frozen foods could be preserved properly during the reconstituting procedure and prior to use. The principal difficulty has been that the emphasis has been placed upon merely heating the food, whereas it is a refrigeration and food preservation problem. Certain foods deteriorate rapidly when thawed very slowly by prior procedures, because the center of a body of food may be at a temperature below freezing while the outside is at a relatively high temperature. With such a condition there may be a zone between the center and the outside which is at a temperature where rapid deterioration takes place, and that portion of the food may become unfit for consumption.

It is an object of the present invention to provide for the reconstituting of frozen foods in an improved manner. It is a further object to provide for the storage and handling of frozen foods so as to prevent a deterioration of quality. It is a further object to provide efficient and dependable methods and apparatus for thawing frozen foods and for storing them before and after the thawing operation without damage to the foods or impairment of the desirable qualities. It is a further object to overcome the difficulties which have been encountered in reconstituting frozen foods. It is a further object to provide for quick and efficient reconstituting of frozen foods so that the foods may be maintained in low temperature storage until the specific demand is ascertained. It is a further object to provide apparatus for carrying out the above in an efficient and dependable manner. These and other objects will be in part obvious and in part pointed out below.

In accordance with the inventions disclosed in the above-identified co-pending applications, the foods are reconstituted by maintaining them in refrigerated condition and yet heating them by pulsating heat in accordance with a predetermined plan or program.

In the illustrative embodiments of the inventions of the above-identified co-pending applications the foods are removed from storage and placed in a refrigerated cabinet which maintains them in frozen condition. With that arrangement, the foods are subjected to pulses of radiant heat in accordance with a predetermined time schedule. The pulses of heat are of controlled intensity and time, and between each pulse and the next there is a predetermined time delay. The timing and duration of the impulses are varied depending upon the particular food (or combination of foods) and its (or their) characteristics. When the food has been fully thawed, it may be heated immediately or stored for later consumption at a temperature which preserves its desirable qualities. After thawing, the food may be heated in many different ways. During thawing and any subsequent above-freezing storage, it is preferable to enclose the foods so as to control the ambient temperature.

In accordance with the present invention, the foods are processed in accordance with the disclosures of the above-identified co-pending applications, but they are moved at a predetermined rate through the reconstituting zone. Hence, the duration of the reconstituting process is controlled by the rate and distance of such movement. In the illustrative embodiment of the present invention, an endless belt conveyor is provided in a refrigerated cabinet and carries the foods through the reconstituting zone and thence from the cabinet. The rate at which the endless belt conveyor moves is controlled, and illustratively it may be varied to satisfy the requirements for reconstituting certain specific foods. Also, the distance which the food travels through the reconstituting zone may be varied. The present invention also incorporates the features of controlling the intensity, timing, and duration of pulses of heat in accordance with the disclosures of the above-identified co-pending applications.

The heating of the food is by electric radiant heating elements which are energized in accordance with a predetermined and variable program to produce pulsating radiant heat. The radiant heat passes through any transparent wrappings on the packages so that it is delivered directly to the food. The radiant heat from beneath the package is delivered to the packaging material and passes by conduction to the food. Air circulation is provided to maintain the desired temperature and humidity of the air within the cabinet. In this embodiment a refrigeration system is provided which cools a stream of air which is then directed over and around the food throughout the reconstituting zone. Hence, the ambient temperature is carefully controlled and the heating of the food is primarily or solely from the radiant heat. This permits accurate control of the reconstituting process.

Referring to the drawings wherein one embodiment of the invention is shown:

FIGURE 3 is a vertical section on a larger scale and on the line 3—3 of FIGURE 4; and, FIGURE 4 is a vertical section on the line 4—4 of FIGURE 3.

Figure 1:
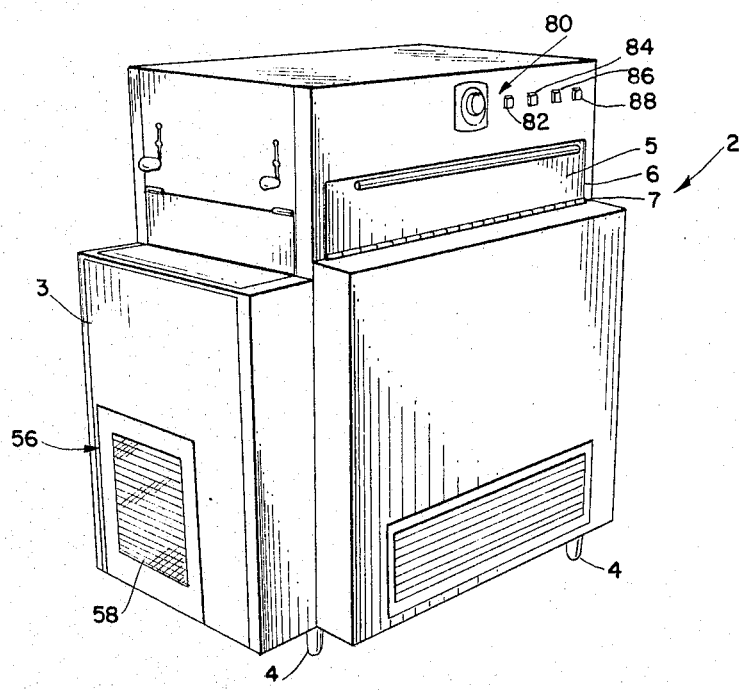
FIGURE 1 is a perspective view of one embodiment of the invention.

Referring to FIGURE 1 of the drawings, a reconstituting unit 2 has a generally rectangular cabinet 3, and is supported at the bottom by four legs 4. Near the top of the front wall there is a rectangular opening 6 which is closed by a door 5 which is hinged along its bottom edge by a hinge 7. A bar handle near the top of the door may be grasped to swing the door outwardly to provide access to the top of the cabinet. As shown best in FIGURE 3, mounted in the cabinet is an endless conveyor 8, a top run 9 of which moves from left to right, and a bottom run 11. The ends of the conveyor project beyond the top of the cabinet so that the top run 9 is exposed at 14 and 16, and adjacent thereto, directly above the conveyor, are two openings which are normally closed by hanging doors 10 and 12, respectively. Doors 10 and 12 are supported at their upper edges by hinges 13 and 15, respectively, and are urged by gravity to the vertical position shown, thus normally closing their openings.

Conveyor 8 is of the open type formed by spaced parallel bars or rods 17 (see also FIGURE 4) extending transversely of the conveyor and supported at their ends by interlocked end portions or links 19. The conveyor is supported at the left (FIGURE 3) by a pair of sprocket wheels 18 which are engaged by the links, and a similar pair of sprocket wheels 20 supports and drives the conveyor at the right. Sprocket wheels 18 and 20 are mounted respectively upon shafts 22 and 24 which are journaled in bearings at the ends of the shafts. The conveyor is driven through a sprocket wheel 28 on shaft 24, a chain 26 and a sprocket wheel 30 which is driven by a drive motor assembly 32. The drive gear assembly includes an electric motor and reduction gear assembly, and means to control the rate at which the conveyor belt is driven.

Adjustably mounted within the top of the cabinet above the conveyor is an upper heater assembly 34, and rigidly mounted beneath the upper run 9 of the conveyor is a lower heater assembly 36. Positioned beneath heater assembly 36 is a removable pan 38 which is supported at its ends by bracket 35, and which may be removed by sliding it from the rear of the cabinet. Similarly supported by brackets 37 beneath the upper heater assembly 34 is a wire mesh screen 39.

Heater assembly 34 is formed by a rigid rectangular frame or casing 41 which is of sheet metal with a top wall 43 and with downwardly projecting periphery flanges. Extending parallel to the direction of movement of the conveyor are six resistance heater elements 45 of the bare wire type (FIGURE 4), each of which is rigidly mounted in a cylindrical quartz tube 47. The tubes and resistance elements are removably mounted at their ends in the casing 41. All of the heater elements are electrically connected in parallel and an electrical circuit is provided through which they are connected to a source of electric power.

Heater assembly 34 is supported at each of its corners by a swinging bracket 49 which has a vertical portion, the bottom end of which is pivoted at 51 to casing 41, and which has a right-angle horizontal portion 53 which carries a knob 55. Referring to FIGURE 4 the wall 57 has a vertical slot 59 formed by three enlarged circular portions 61, 63, and 65 interconnected by narrow slots 67. The reduced end of knob 55 (FIGURE 3) is adapted to nest in any one of the enlarged portions 61, 63, or 65 and when so positioned that corner of the heater assembly is supported from the wall 57 by the bracket 49. However, when it is desirable to change the height of the heater assembly the operator pulls outwardly upon the two knobs 55 at one end of the cabinet and exerts lifting forces. The horizontal portions 53 of the brackets will move freely in the narrow slots 67, so that when the two knobs 55 at one end of the heater assembly are pulled outwardly the operator may move that end of the heater assembly to any of the three selected positions. The other end of the heater assembly is then moved to the new height in a similar manner. In FIGURE 4, the heater assembly is shown in full lines in its lowest position, and is shown in its top position in broken lines.

The lower heater assembly 36 has a rectangular frame 69 and six heater element assemblies 45–47 identical with those of the upper heater assembly. However, as indicated above, a pan 38 is positioned beneath the heater elements and reflects the radiant heat upwardly while the top wall 43 reflects the radiant heat downwardly.

At the bottom of the unit there are two blowers 40 with electric motors 48, which draw air in through a louver assembly 50, a filter 42 and directs it upwardly through an air cooling chamber 44 from the top of which it is discharged horizontally through an opening 46 (FIGURE 4). The air flows over and around the food upon the conveyor and then flows downwardly at the opposite edge of the conveyor and it is discharged through an opening 52 in the bottom of the cabinet.

Figure 2:
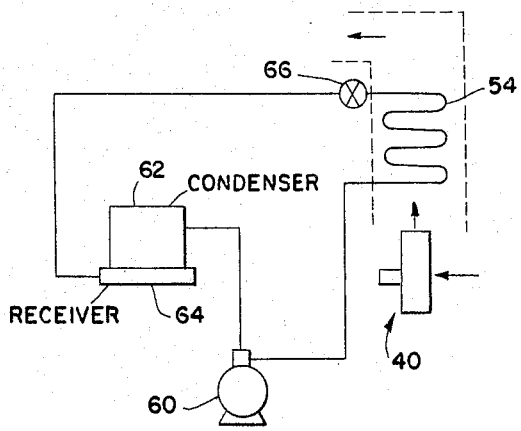
FIGURE 2 is a schematic representation of the refrigeration system of FIGURE 1.

Positioned within chamber 44 is a finned coil evaporator 54 which cools the air as it flows upwardly. Evaporator 54 is part of a refrigeration system which is mounted in a casing in the bottom of the cabinet in an enclosure 56 having a grill 58 (see FIGURE 1) through which cooling air may flow. As represented schematically in FIGURE 2, the refrigeration system includes a compressor 60, an air cooled condenser 62, a receiver 64, an expansion valve 66, and the evaporator 54.

As indicated above, the conveyor moves from left to right in FIGURE 3, and as a package of food moves to the right from 14 on the conveyor, it swings door 10 up sufficiently to permit the package to pass. The package is then carried at the slow rate through the reconstituting zone and is subjected to the pulsating radiant heat of the heater assemblies 34 and 36. The rate of movement and the pulsating program is such that the food is completely thawed when it reaches the door 12 at the right. The food package swings this door away from the vertical position sufficiently to permit the package to pass, and the operator removes the package from the conveyor at 16. Under some circumstances, conveying means may be provided to handle the packages automatically as they emerge at 16.

The radiant heat from the upper heater assembly 34 passes through screen 39 and is delivered directly to the food upon the conveyor. The heat from the bottom heater assembly is delivered through the bottom run of the conveyor to the bottom surface of the packages. The spacing between the bars 17 is relatively great, and the small cylindrical bars do not interfere materially with the passage of the heat. Any material which falls through the conveyor drops down between the heater elements into the tray 38, and the tray is removed and cleaned when desirable.

The constant flow of the cool air through the reconstituting zone maintains the desired ambient temperature throughout that zone. Hence, the packages of food are heated by the pulsating radiant heat in accordance with the predetermined and variable program. The program is set by a control knob assembly 80 (FIGURE 1) by which the operator may control the frequency and duration of the heating impulses. As indicated above, the upper heater is moved up and down to control the intensity of the radiant heat. The quartz tubes 47 protect the heater elements from the cooling effect of the ambient air so that uniform radiant heat is provided. All of the heating elements are turned on for a predetermined number of seconds, and then turned off for a predetermined number of seconds. It has been indicated above that the rate of movement of the conveyor is also regulated so that the food is subjected to the pulsating heat for the desired period of time. Positioned at the right of knob assembly 80 are four manual control buttons which start and stop the following functions: refrigeration, 82; heating, 84; conveyor, 86; and, blowers or air circulation, 88.

In addition to the other control features, the operator may place packages of food at any selected position along the conveyor by swinging door 5 (FIGURE 1) downwardly and reaching in through opening 6. For that purpose a numeral calibration or other indicia may be placed above opening 6 for the guidance of the operator. The invention also contemplates that one or more of the heater elements may be blocked off by a shield or shields for a predetermined portion of their lengths. With such an arrangement, for example, foods placed upon one side of the conveyor will be subjected to a lesser amount of heating than those placed at the center or at the other side of the conveyor.

In the above-identified co-pending applications we have set forth our understanding of the basic principles of this general mode of reconstituting foods. For convenience, that explanation will now be set forth herein. The basic principle appears to be subjecting the foods to "impulse heating," which term is used herein to mean heating in accordance with a predetermined time schedule or program in the form of a series of time cycles, with each cycle comprising a period of intense heating followed by a period of no heating. The radiant heat acts like light so that it passes through transparent wrappings and is absorbed by the surface layers on the food and the non-transparent wrappings. The temperature of each such surface layer is thereby elevated at a very rapid rate. However, when the heating is discontinued in the "off" period, the heat from this surface layer passes by conduction to the interior of the food. Hence, during the program of the heating cycles heat is delivered to the food until the food is completely thawed. However, during each "on" period the temperature of the outer layer of food is not elevated sufficiently to cause any objectionable change in the food. The heating cycles are of such duration as to provide rapid reconstituting of the food and a sufficient number of heating cycles is carried on to bring the food to the desired temperature at which it may be stored, or it may be heated further. Within the period of time when a particular portion of food is approaching the thawing temperature, it is believed that certain of the crystalline or frozen juices may be thawed and refrozen, particularly near the surface where the heat is being applied. However, the experience with various foods has indicated that any such thawing and refreezing does not damage the food when care is taken to properly control the cycling operations. It should be noted that the invention permits a wide range of operation in that the following factors may be varied: The relative lengths of the heating and non-heating periods of each cycle; the total length of the cycle; the intensity of the heating; and, the total amount of heating which depends upon the rate of movement of the conveyor and the distance which the food travels in the zone.

It should be noted that radiant heating is very advantageous in that it delivers heat to the surfaces of the foods in a controlled and dependable manner. Transparent wrappings permit the passage of radiant heat with reasonable efficiency and without damage to the wrappings. Furthermore, radiant heat can be delivered with relatively high intensity and yet can be turned off and on fairly rapidly.

As many possible embodiments may be made of the method, apparatus and product features of the above invention and as the art herein described might be varied in various parts, all without departing from the scope of the invention, it is to be understood that all matter hereinbefore set forth is to be interpreted as illustrative and not in a limiting sense.

What is claimed is:

1. In a unit for thawing frozen foods, the combination of, a cabinet, a refrigeration system including an evaporator to maintain the air in said cabinet at a predetermined temperature, means to supply impulses of radiant heat to food within said cabinet to raise the temperature of the food from a subfreezing temperature to above the thawing temperature with each impulse of heat being delivered to the food in a time cycle which includes a period during which heat delivered to the outer surface of the food passes to the interior of the food, and conveyor means to pass the food through said cabinet in a controlled manner, said conveyor means being arranged to move the foods at a predetermined rate and for a selected distance past said means to supply impulses of radiant heat whereby said conveyor means acts as timer means to determine the time during which the food is subjected to the impulses of radiant heat.

2. Apparatus as described in claim 1 which includes, air circulating means to circulate air past the food in said cabinet, and control means to control the temperature of the circulated air.

3. Apparatus as described in claim 1 wherein said means to supply impulses of heat comprise tubular-sheathed radiant heaters positioned within the cabinet.

4. Apparatus as described in claim 3 wherein each of said heaters comprises an electric heater element of the bare wire type and a quartz tube surrounding said heater element, and means rigidly mounting a plurality of said heaters above said conveyor means.

5. Apparatus as described in claim 4 which includes a plurality of said heaters positioned beneath said conveyor means, and wherein said conveyor means is of the open type wherein the food is supported upon rods or the like.

6. Apparatus as described in claim 1 wherein said means to supply impulses of heat comprises a bar of heater assemblies positioned respectively above and below the food within said cabinet, each of said heater assemblies comprising a plurality of parallel heater units each of which comprises an elongated resistance element and a quartz tube surrounding the same.

7. Apparatus as described in claim 6 which includes mounting means for said heaters positioned above the food, and a plurality of adjustable supports for said mounting means each of which comprises a swingable bracket and fixed means having a vertical slot within which said bracket slides and is adapted to interengage to provide a fixed support.

8. Apparatus as described in claim 1 wherein said means to supply impulses of heat comprises radiant heaters, and which includes, a refrigeration system having an air cooling evaporator, and an air circulating means which directs a stream of air to be cooled by said evaporator and thence horizontally over and around food within the cabinet thereby to maintain a controlled ambient temperature.

9. Apparatus as described in claim 1 wherein said conveyor means comprises a conveyor having a top run the ends of which project from the sides of the cabinet, said cabinet having hanging doors positioned in the path of food being carried by said conveyor means to and from said cabinet, and said cabinet including a door parallel to the path of said top run of said conveyor means and giving access to the top sides thereof.

10. In apparatus of the character described for thawing frozen products and maintaining the desired conditions of quality, the combination of, cabinet means providing a substantially enclosed space which extends substantially horizontally through a thawing zone, an endless conveyor having a horizontal run extending through said thawing zone and adapted to support and move the products therethrough in a horizontal direction with the products presenting exposed surfaces, mounting and drive means for said endless conveyor to impart the horizontal movement to said run, electrical radiant heating means mounted within said cabinet means and positioned adjacent to said exposed surfaces of the products when passing through said thawing zone upon said endless conveyor, control means to control the delivery of radiant heat from said radiant heating means to said exposed surfaces including means to provide pulses of said radiant heat, and means to provide air of controlled temperature in said thawing zone so as to maintain the air adjacent said exposed surfaces below a predetermined temperature.

11. Apparatus as described in claim 10 wherein said cabinet means includes a door which is positioned along said run of said endless conveyor and through which products may be selectively positioned within said thawing zone to provide a selective thawing action with a constant movement of said run.

12. Apparatus as described in claim 10 wherein said conveyor is of the open type whereby the top and bottom surfaces of the products are exposed within said thawing zone, and wherein said electrical radiant heating means are mounted respectively above and below said run.

13. Apparatus as described in claim 12 wherein said means to provide air of controlled temperature comprises a refrigeration means to cool the air and means to circulate the cooled air horizontally through said thawing zone.

References Cited by the Examiner

UNITED STATES PATENTS

| | | | |
|---|---|---|---|
| 2,480,954 | 9/1949 | Palmer | 34—5 X |
| 2,600,566 | 6/1952 | Moffett | 99—221 |
| 2,714,070 | 7/1955 | Welch | 99—221 |
| 2,823,902 | 2/1958 | Reynolds | 165—48 X |
| 3,027,442 | 3/1962 | Verstraten | 219—10.55 |
| 3,056,877 | 10/1962 | Schmidt et al. | 219—10.47 |
| 3,108,173 | 10/1963 | Barrett et al. | 219—411 X |
| 3,157,476 | 11/1964 | Smith | 34—39 X |

ROBERT A. O'LEARY, *Primary Examiner.*

A. LOUIS MONACELL, FREDERICK L. MATTESON, JR., *Examiners.*

L. M. SHAPIRO, M. A. ANTONAKAS,
*Assistant Examiners.*